US012359995B2

United States Patent
An et al.

(10) Patent No.: US 12,359,995 B2
(45) Date of Patent: Jul. 15, 2025

(54) PRESSURE SENSOR AND ELECTRONIC DEVICE HAVING A SECOND OUTPUT TERMINAL OF A WHEATSTONE BRIDGE AND A SECOND TERMINAL OF A HEAT EMITTING DIODE BEING CONFIGURED FOR OUTPUTTING ELECTRICAL SIGNALS

(71) Applicant: Honor Device Co., Ltd., Shenzhen (CN)

(72) Inventors: Yabin An, Shenzhen (CN); Haiming He, Shenzhen (CN); Mingyuan Zhao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 334 days.

(21) Appl. No.: 18/022,382

(22) PCT Filed: Mar. 25, 2022

(86) PCT No.: PCT/CN2022/083188
§ 371 (c)(1),
(2) Date: Feb. 21, 2023

(87) PCT Pub. No.: WO2022/218137
PCT Pub. Date: Oct. 20, 2022

(65) Prior Publication Data
US 2023/0324245 A1 Oct. 12, 2023

(30) Foreign Application Priority Data
Apr. 16, 2021 (CN) .......................... 202110414419.1

(51) Int. Cl.
*G01L 9/06* (2006.01)
*G01L 9/00* (2006.01)

(52) U.S. Cl.
CPC ............ *G01L 9/065* (2013.01); *G01L 9/0054* (2013.01)

(58) Field of Classification Search
None
See application file for complete search history.

(56) References Cited

U.S. PATENT DOCUMENTS 4,300,395 A * 11/1981 Shirouzu ............... G01L 9/0054
338/42
7,100,455 B2 * 9/2006 Lepine .................. G01L 19/148
324/714

(Continued)

FOREIGN PATENT DOCUMENTS

BR 102019026566-3 A2 2/2021
CN 201069402 Y 6/2008

(Continued)

OTHER PUBLICATIONS

Mohtashim Mansoor et al., "Silicon diode temperature sensors—A review of applications," XP093126649, 42 pages (Aug. 1, 2015).

*Primary Examiner* — Peter J Macchiarolo
*Assistant Examiner* — Jermaine L Jenkins
(74) *Attorney, Agent, or Firm* — Leydig, Voit & Mayer, Ltd.

(57) ABSTRACT

A pressure sensor includes a Wheatstone bridge and a heat emitting diode. The Wheatstone bridge includes a first resistor, a second resistor, a third resistor, and a fourth resistor. The first resistor, the second resistor, the third resistor, and the fourth resistor are coupled to form a loop, the first resistor, the second resistor, and the third resistor are fixed resistors, and the fourth resistor is a varistor. A first output terminal of the Wheatstone bridge is coupled to a first terminal of the heat emitting diode, and a second output terminal of the Wheatstone bridge and a second terminal of (Continued)

the heat emitting diode are configured to output an electrical signal.

20 Claims, 11 Drawing Sheets

(56) References Cited

U.S. PATENT DOCUMENTS

| | | | |
|---|---|---|---|
| 7,252,009 B2 * | 8/2007 | Kosh | G01L 19/143 |
| | | | 73/753 |
| 10,528,174 B2 | 1/2020 | Kim et al. | |
| 11,099,093 B2 | 8/2021 | Potasek et al. | |
| 2010/0123468 A1 | 5/2010 | Kim et al. | |

FOREIGN PATENT DOCUMENTS

| | | | | |
|---|---|---|---|---|
| CN | 102341685 A | * | 2/2012 | ......... B81C 1/00158 |
| CN | 105224129 A | | 1/2016 | |
| CN | 207964135 U | | 10/2018 | |
| CN | 108874271 A | | 11/2018 | |
| CN | 209372289 U | | 9/2019 | |
| CN | 110767652 A | | 2/2020 | |
| CN | 113301190 A | | 8/2021 | |

* cited by examiner

PRESSURE SENSOR AND ELECTRONIC DEVICE HAVING A SECOND OUTPUT TERMINAL OF A WHEATSTONE BRIDGE AND A SECOND TERMINAL OF A HEAT EMITTING DIODE BEING CONFIGURED FOR OUTPUTTING ELECTRICAL SIGNALS

CROSS-REFERENCE TO RELATED APPLICATIONS

This application is a national stage of International Application No. PCT/CN2022/083188, filed on Mar. 25, 2022, which claims priority to Chinese Patent Application No. 202110414419.1, filed on Apr. 16, 2021. The disclosures of both of the aforementioned applications are hereby incorporated by reference in their entireties.

TECHNICAL FIELD

Embodiments of this application relate to the field of touch technologies, and in particular, to a pressure sensor and an electronic device.

BACKGROUND

With development of mobile device technologies, integration will become a trend, which has great advantages in terms of waterproofing and user experience. To implement integration of mobile terminals, an electronic device may provide a pressure sensor in an area where a physical key needs to be provided. The pressure sensor may detect, by using piezoresistivity of a varistor, a pressing operation input by a user, so as to implement a specific function of the physical key, such as screen capture, photographing, and volume adjustment. Such a key that implements a key function by using piezoresistivity of a varistor may be referred to as a pressure sensitive key. Alternatively, because such a key is invisible in the appearance of the electronic device, such a key may be referred to as a virtual key or the like.

The pressure sensor in the electronic device performs pressure detection by using the varistor based on the following principle: When an area where the varistor is provided on the electronic device is squeezed by an external force, the external force is transmitted to the varistor through a housing of the electronic device, so that the varistor is deformed. A resistance of the deformed varistor will change. In this case, the pressure sensor outputs an electrical signal (for example, a current signal or a voltage signal), and the electronic device can detect a pressure based on the electrical signal.

The resistance of the varistor will not only change due to deformation of the varistor, but also be affected by environmental conditions (for example, temperature and humidity). In addition, impact of temperature on the resistance of the varistor is particularly significant. In the foregoing solution, the impact of temperature on the varistor is not considered, and consequently, detection accuracy of the pressure sensor is low.

SUMMARY

Embodiments of this application provide a pressure sensor and an electronic device, to reduce impact of temperature on detection accuracy of the pressure sensor.

To achieve the foregoing objective, the following technical solutions are used in embodiments of this application.

According to a first aspect, this application provides a pressure sensor, including: a Wheatstone bridge and a heat emitting diode, where the Wheatstone bridge includes a first resistor, a second resistor, a third resistor, and a fourth resistor; and the first resistor, the second resistor, the third resistor, and the fourth resistor are coupled to form a loop, the first resistor, the second resistor, and the third resistor are fixed resistors, and the fourth resistor is a varistor.

A coupling point of the first resistor and the second resistor serves as a first input terminal of the Wheatstone bridge, a coupling point of the third resistor and the fourth resistor serves as a second input terminal of the Wheatstone bridge, and the first input terminal and the second input terminal are configured to input a constant voltage or a pulse voltage. A coupling point of the second resistor and the fourth resistor serves as a first output terminal of the Wheatstone bridge and is coupled to a first terminal of the heat emitting diode, a coupling point of the first resistor and the third resistor serves as a second output terminal of the Wheatstone bridge, the second output terminal of the Wheatstone bridge and a second terminal of the heat emitting diode are configured to output an electrical signal, and the electrical signal may be a current signal or a voltage signal.

When temperature increases, an equivalent resistance of the heat emitting diode decreases, and a resistance of the fourth resistor increases; and when the temperature decreases, the equivalent resistance of the heat emitting diode increases, and the resistance of the fourth resistor decreases. That is, a change trend of the equivalent resistance of the heat emitting diode with the temperature is opposite to that of the resistance of the varistor with the temperature, so as to compensate for a change in the resistance of the varistor due to temperature changes, and improve detection accuracy of the pressure sensor.

With reference to the first aspect, in a possible design manner, the heat emitting diode includes a low temperature polysilicon (LTPS) P-channel metal oxide semiconductor (PMOS) and a first metal layer disposed on the LTPS PMOS, the LTPS PMOS is in point contact with the first metal layer, a first contact is led out from the LTPS PMOS, and a second contact is led out from the first metal layer. The heat emitting diode is a P-type heat emitting diode.

With reference to the first aspect, in a possible design manner, the heat emitting diode includes an indium gallium zinc oxide (IGZO) and a second metal layer disposed on the IGZO, the IGZO is in point contact with the second metal layer, a first contact is led out from the second metal layer, and a second contact is led out from the IGZO. The heat emitting diode is an N-type heat emitting diode.

With reference to the first aspect, in a possible design manner, the heat emitting diode includes an LTPS PMOS, an IGZO, a first metal layer disposed on the LTPS PMOS, and a second metal layer disposed on the IGZO, the first metal layer and the second metal layer are coupled, the LTPS PMOS is in point contact with the first metal layer, the IGZO is in point contact with the second metal layer, a first contact is led out from the LTPS PMOS, and a second contact is led out from the IGZO. The heat emitting diode is obtained by coupling the P-type heat emitting diode to the N-type heat emitting diode.

With reference to the first aspect, in a possible design manner, the first contact is the first terminal of the heat emitting diode, and the second contact is the second terminal of the heat emitting diode; or the first contact is the second terminal of the heat emitting diode, and the second contact is the first terminal of the heat emitting diode. That is, either terminal of the heat emitting diode may be coupled to an output terminal of the Wheatstone bridge.

With reference to the first aspect, in a possible design manner, the metal layer includes at least one of molybdenum, aluminum, and copper. That is, the metal layer may also be a molybdenum-aluminum alloy, a molybdenum-copper alloy, an aluminum-copper alloy, or a molybdenum-aluminum-copper alloy.

With reference to the first aspect, in a possible design manner, the first output terminal of the Wheatstone bridge is further coupled to a capacitor.

With reference to the first aspect, in a possible design manner, the first input terminal and the second input terminal of the Wheatstone bridge may be further coupled to an alternating current signal generator, and the alternating current signal generator is configured to output an alternating current signal, such as a sinusoidal wave, a triangular wave, or a pulse, to the pressure sensor. If a direct current signal is input to an input terminal of the pressure sensor for a long time, power consumption will be increased; and aging of the device is caused, and detection accuracy is easily reduced. Therefore, high frequency detection may be implemented by inputting an alternating current signal to the input terminal of the pressure sensor, so that the foregoing problems can be avoided.

With reference to the first aspect, in a possible design manner, the first resistor, the second resistor or the third resistor is a film resistor, and the film resistor includes a semiconductor film resistor and a high impedance metal film resistor. A bridge arm of the Wheatstone bridge is designed as a film resistor for integration in a display.

With reference to the first aspect, in a possible design manner, the semiconductor film resistor includes an amorphous silicon film resistor, an LTPS film resistor, and an IGZO film resistor.

With reference to the first aspect, in a possible design manner, the high impedance metal film resistor includes nickel, copper, manganese, and chromium.

With reference to the first aspect, in a possible design manner, the pressure sensor may be disposed in an interlevel dielectric layer of an organic light-emitting diode (OLED) display. Certainly, the pressure sensor may be disposed in another layer of the OLED display. This is not limited in this embodiment of this application.

According to a second aspect, this application provides an electronic device, including an OLED display and a processor, where the display includes the pressure sensor according to the first aspect and any one of the design manners of the first aspect, and the pressure sensor is configured to output an electrical signal corresponding to a touch pressure of the OLED display to the processor. A function of a pressure sensitive key may be implemented by pressing on an area in which the pressure sensor of the display is located.

DESCRIPTION OF EMBODIMENTS

As previously described, a pressure sensor may be disposed on an electronic device, for example, may be integrated in a display (for example, may be integrated at a center or an edge of the display), or may be disposed on a frame (for example, a left frame, a right frame, an upper frame, or a lower frame), or may be disposed on a front or back of the electronic device. This application uses an application scenario in which a pressure sensor is integrated in a display as an example, but is not intended to be limited thereto.

When the pressure sensor is disposed on the display, the pressure sensor may be used as a pressure sensitive key of an electronic device, the pressure sensor may detect an electrical signal generated by a pressing operation input by a user by using piezoresistivity of a varistor. Based on the electrical signal, the electronic device may implement related functions of physical keys, such as screen capture, photographing, and volume adjustment. In this way, physical keys disposed on a surface of the electronic device may be reduced, so that the electronic device is more beautiful in appearance, and has a waterproof function. In some other embodiments, such keys may be referred to as virtual keys (virtual keys) or the like. This is not limited in this embodiment of this application.

Figure 1:
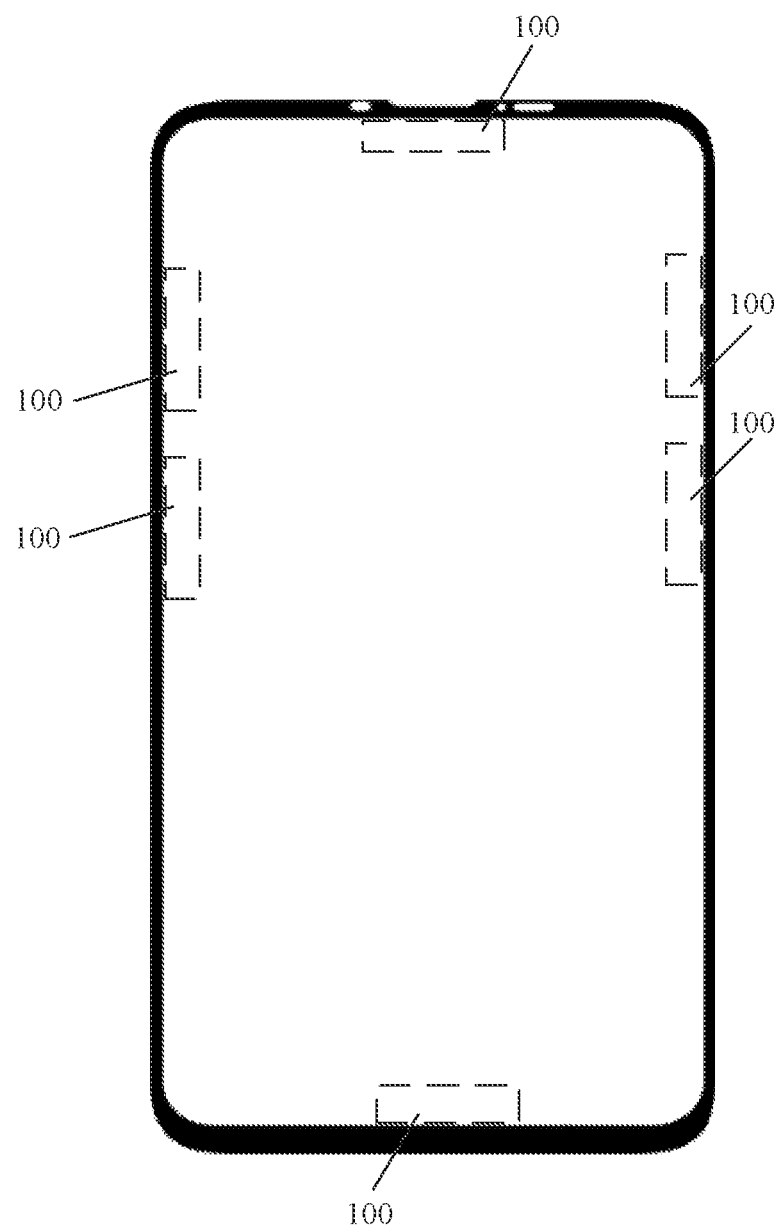
FIG. 1 is a schematic diagram of an appearance of an electronic device including a pressure sensor according to an embodiment of this application.

For example, as shown in FIG. 1, using that the electronic device is a mobile phone as an example, a pressure sensor 100 may be disposed at a left edge, a right edge, an upper edge, or a lower edge of a display of the mobile phone. The display may be a flexible curved screen, for example, an organic light-emitting diode (OLED) display. When a user presses an edge of the display, the display transmits a pressure to a pressure sensor, so as to implement pressure detection. A quantity of the pressure sensor disposed on the electronic device is not limited in this application, which may be one or more. For example, as shown in FIG. 1, a plurality of pressure sensors 100 may be disposed at a left edge or right edge of the display. In addition, as a pressure sensitive key, the pressure sensor may be disposed at a position of the electronic device with reference to a position of a physical key (for example, a "volume+" key, a "volume−" key, a photographing key, or a screen lock key) on the electronic device.

Figure 2:
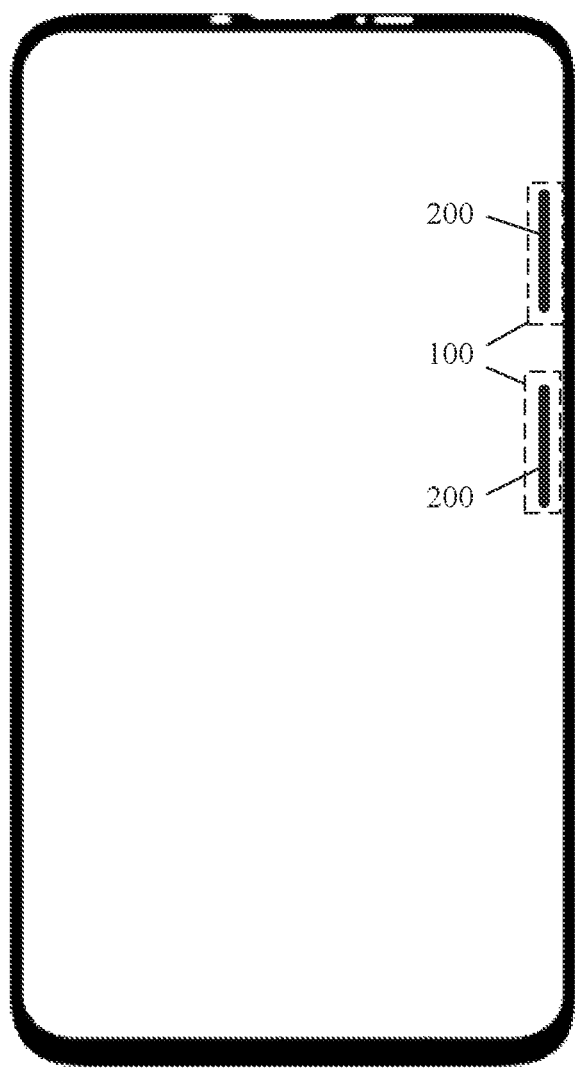
FIG. 2 is a schematic diagram of an appearance of another electronic device including a pressure sensor according to an embodiment of this application.

Generally, unlike physical keys, a pressure sensor disposed on an electronic device is located inside the electronic device, so that pressure sensitive keys are invisible to a user. For ease of use by the user, an identifier visible to the user of the pressure sensor may be provided on the mobile phone. For example, as shown in FIG. 2, a virtual key 200 may be displayed at a position where the pressure sensor 100 is located in the display when the user touches an edge of the display.

In this embodiment of this application, a unit of a pressing pressure may be Newton, with a symbol of N. In physics, a gravity of an object is calculated by using a formula G=mg, where G is a gravity, m is a mass, g is a constant, and g is about 9.8 N/kg. That is, the gravity is proportional to the mass. Therefore, a unit of the mass m may be used as the unit of a pressing pressure and a pressure threshold in this embodiment. The unit of the mass m is kilogram (with a symbol of kg) or gram (with a symbol of g). For example, in this embodiment, the unit of the pressing pressure maybe gram, with a symbol of g.

Alternatively, the unit of the pressing pressure may be kilopascal (kPa), where kPa is a unit of pressure. The kPa may be converted into an engineering mechanical unit: kilogram force (kgf) or kilogram force/square centimeter (kgf/cm^2), that is, a pressure produced by a 1 kilogram object on an area of 1 square centimeter is approximately equal to one atmospheric pressure. A pressure is generally expressed by using a kilogram force in engineering. A conversion relationship is as follows: 1 kgf=100000 pascal (Pa)=100 kPa=0.1 megapascal (MPa). Alternatively, the unit of the pressing pressure may be Newton/square meter (N/m2).

The electronic device in this embodiment of this application may be a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, a smart band, a smartwatch, a headset, a smart speaker, or a device that is provided with a pressure sensor. A specific form of the electronic device is not specially limited in this embodiment of this application.

Figure 3:
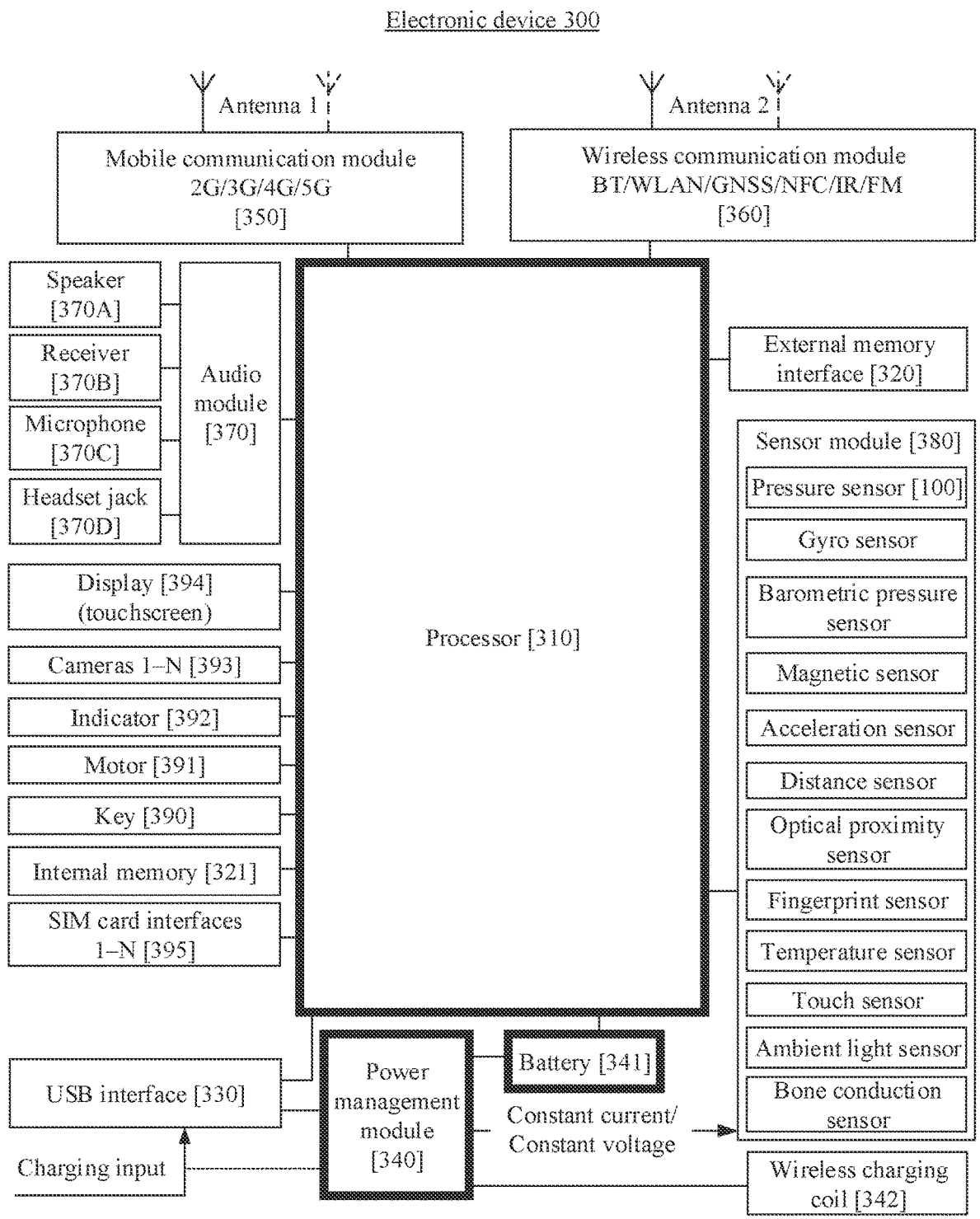
FIG. 3 is a schematic diagram of a structure of another electronic device including a pressure sensor according to an embodiment of this application.

As shown in FIG. 3, an embodiment of this application provides an electronic device 300, and the electronic device 300 may be the mobile phone shown in FIG. 1 and FIG. 2. The electronic device 300 may include a processor 310, a pressure sensor 100, an external memory interface 320, an internal memory 321, a universal serial bus (USB) interface 330, a power management module 340, a battery 341, a wireless charging coil 342, an antenna 1, an antenna 2, a mobile communication module 350, a wireless communication module 360, an audio module 370, a speaker 370A, a receiver 370B, a microphone 370C, a headset jack 370D, a sensor module 380, a key 390, a motor 391, an indicator 392, a camera 393, a display 394, a subscriber identification module (SIM) card interface 395, and the like.

The sensor module 380 may include a pressure sensor 100, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that an example structure in this embodiment of the present disclosure does not constitute a specific limitation on the electronic device 300. In some other embodiments, the electronic device 300 may include more or fewer components than those shown in the figure, or may combine some components, or may split some components, or may have different component arrangements. The components in the figure may be implemented by hardware, software, or a combination of software and hardware.

The processor 310 may include one or more processing units. For example, the processor 310 may include an application processor (AP), a modem processor, a graphics processing unit (GPU), an image signal processor (ISP), a controller, a memory, a video codec, a digital signal processor (DSP), a baseband processor, a neural network processing unit (NPU), and the like. Different processing units may be independent devices, or may be integrated into one or more processors. For example, the processor 310 may be an application processor AP. Alternatively, the processor 310 may be integrated in a system on chip (SOC). Alternatively, the processor 310 may be integrated in an IC chip. The processor 310 may include an analog front end (AFE) and a microcontroller unit (MCU) in the IC chip.

The controller may be a nerve center and a command center of the electronic device 300. The controller may generate an operation control signal based on instruction operation code and a timing signal, to complete control of instruction fetching and instruction execution.

The processor 310 may be further provided with a memory for storing instructions and data. In some embodiments, the memory in the processor 310 is a cache. The memory may store instructions or data just used or cyclically used by the processor 310. If the processor 310 needs to use the instructions or the data again, the processor 310 may directly invoke the instructions or the data from the memory. Repeated access is avoided, and a waiting time of the processor 310 is reduced, thereby improving system efficiency.

In some embodiments, the processor 310 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, and/or a USB interface.

It can be understood that the interface connection relationship between the modules illustrated in embodiments of the present disclosure is merely an example for description, and does not constitute a limitation on the structure of the electronic device 300. In some other embodiments of this application, the electronic device 300 may alternatively use an interface connection manner different from those in the foregoing embodiment or a combination of a plurality of interface connection manners.

The power management module 340 is configured to receive a charging input from a charger. The charger may be a wireless charger (such as a wireless charging base of the electronic device 300 or another device that can wirelessly charge the electronic device 300), or may be a wired charger. For example, the power management module 340 may receive a charging input from the wired charger by using a USB interface 330. The power management module 340 may receive a wireless charging input by using a wireless charging coil 342 of the electronic device.

The power management module 340 may supply power to the electronic device while charging the battery 341. The power management module 340 receives an input of the battery 341, and supplies power to the processor 310, the pressure sensor 100, the internal memory 321, the external memory interface 320, the display 394, the camera 393, the wireless communication module 360, and the like. The power management module 340 may be further configured to monitor parameters such as a battery capacity, a battery cycle count, and a battery health status (leakage and impedance) of the battery 341. In some other embodiments, the power management module 340 may also be disposed in the processor 310. For example, in this embodiment of this application, the power management module 340 may provide a constant voltage source (for example, a constant voltage at 5 volts (V)) or a constant current source to the pressure sensor 100.

A wireless communication function of the electronic device 300 may be implemented by using the antenna 1, the antenna 2, the mobile communication module 350, the wireless communication module 360, the modem processor, the baseband processor, and the like.

The antenna 1 and the antenna 2 are configured to transmit and receive electromagnetic wave signals. Each antenna in the electronic device 300 may be configured to cover one or more communication bands. Different antennas may be further multiplexed to improve antenna utilization. For example, the antenna 1 may be multiplexed into a diversity antenna for a wireless local area network. In some other embodiments, the antenna may be used in combination with a tuning switch.

The mobile communication module 350 may provide a wireless communication solution applied to the electronic device 300, including 2G/3G/4G/5G. The wireless communication module 360 may provide a wireless communication solution applied to the electronic device 300, including a wireless local area network (WLAN) (for example, a wireless fidelity (Wi-Fi) network), bluetooth (BT), a global navigation satellite system (GNSS), frequency modulation (FM), near field communication (NFC), or infrared (IR) technology. In some embodiments, the antenna 1 and the mobile communication module 350 of the electronic device 300 are coupled, and the antenna 2 and the wireless communication module 360 are coupled, so that the electronic device 300 can communicate with a network and another device by using a wireless communication technology.

The electronic device 300 implements a display function by using the GPU, the display 394, the application processor, and the like. The GPU is an image processing microprocessor and is connected to the display 394 and the application processor. The GPU is configured to perform mathematical and geometric calculations to render graphics. The processor 310 may include one or more GPUs that execute a program instruction to generate or change display information.

The display 394 is configured to display an image, a video, and the like. The display 394 includes a display panel. In some embodiments, the electronic device 300 may include one or N displays 394, where N is a positive integer greater than 1.

The electronic device 300 may implement a photographing function by using the ISP, the camera 393, the video codec, the GPU, the display 394, the application processor, and the like. The ISP is configured to process data fed back by the camera 393. In some embodiments, the ISP may be disposed in the camera 393. The camera 393 is configured to capture a still image or a video. In some embodiments, the electronic device 300 may include one or N cameras 393, where N is a positive integer greater than 1.

The external memory interface 320 may be configured to connect to an external memory card such as a Micro SD card, so as to expand a storage capacity of the electronic device 300. The external memory card communicates with the processor 310 by using the external storage interface 320, so as to implement a data storage function. For example, files such as music and videos are stored in the external storage card.

The internal memory 321 may be configured to store computer executable program code, and the executable program code includes instructions. The processor 310 performs various function applications and data processing of the electronic device 300 by running the instructions stored in the internal memory 321. In addition, the internal memory 321 may include a high-speed random access memory, and may further include a non-volatile memory, such as at least one magnetic disk storage component, a flash memory component, and a universal flash storage (UFS).

The electronic device 300 may implement an audio function, such as music playing and recording, by using the audio module 370, the speaker 370A, the receiver 370B, the microphone 370C, the headset jack 370D, the application processor, and the like.

The audio module 370 is configured to convert digital audio information into an analog audio signal for output, and is further configured to convert an analog audio input into a digital audio signal. In some embodiments, the audio module 370 may be configured in the processor 310, or some functional modules of the audio module 370 may be configured in the processor 310. The speaker 370A, also referred to as a "horn", is configured to convert an audio electrical signal into a sound signal. The receiver 370B, also referred to as an "earpiece", is configured to convert an audio electrical signal into a sound signal. The microphone 370C, also referred to as a "mike" or a "mic", is configured to convert a sound signal into an electrical signal. At least one microphone 370C may be disposed in the electronic device 300. The headset jack 370D is configured to connect a wired headset. The headset jack 370D may be the USB interface 330, or may be a 3.5 mm open mobile terminal platform (OMTP) standard interface or a cellular telecommunications industry association of the USA (CTIA) standard interface.

The key 390 includes a power key, a volume key, and the like. The key 390 may be a mechanical key, or may be a touch key. The electronic device 300 may receive a key input to generate a key signal input related to user settings and function control of the electronic device 300. The motor 391 may generate a vibration prompt. The motor 391 may be configured to provide a vibration prompt for an incoming call, and may be further configured to provide touch vibration feedback. The indicator 392 may be an indicator light, which may be configured to indicate a charging state and a power change, or may be configured to indicate a message, a missed call, a notification, or the like. The SIM card interface 395 is configured to connect to a SIM card. The SIM card may be inserted into the SIM card interface 395 or removed from the SIM card interface 395, so that the SIM card is in contact with or separated from the electronic device 300. The electronic device 300 may support one or N SIM card interfaces, where N is a positive integer greater than 1. The SIM card interface 395 may support a nano SIM card, a micro SIM card, a SIM card, and the like. In some embodiments, the electronic device 300 uses an eSIM, that is, an embedded SIM card. The eSIM card may be embedded in the electronic device 300 and cannot be separated from the electronic device 300.

The pressure sensor 100 is configured to detect a pressing operation of a user on the pressure sensor, output an electrical signal to the processor 310, and process the electrical signal by the processor 310 to obtain a pressure.

Figure 4:
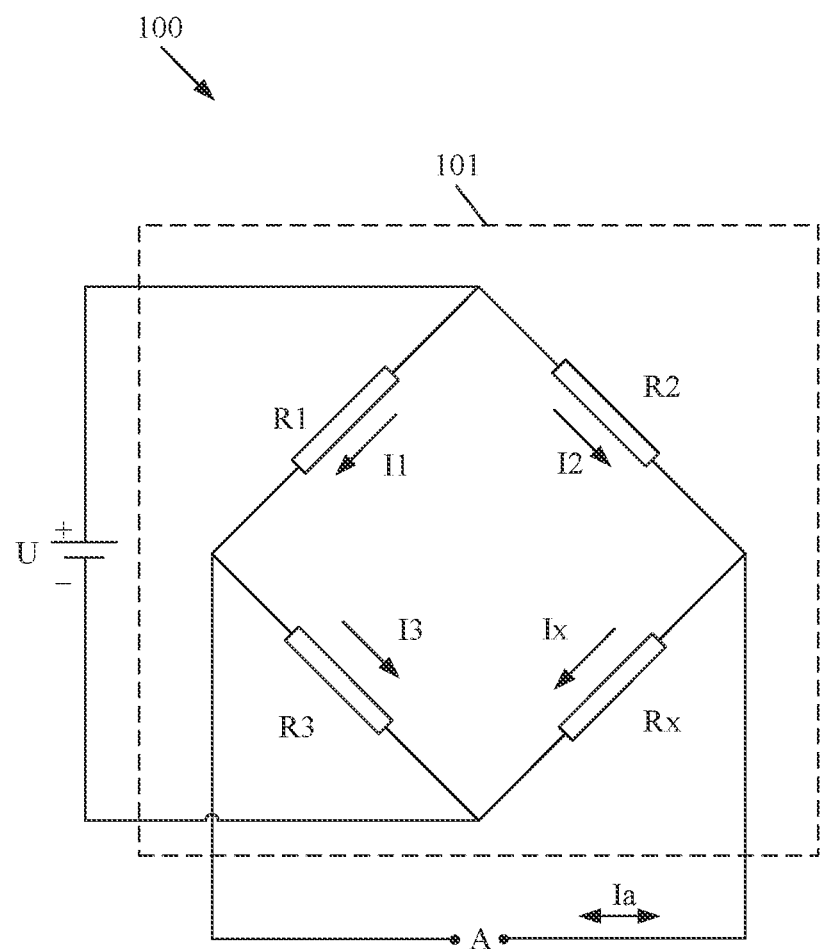
FIG. 4 is a schematic diagram of a structure of a pressure sensor including a Wheatstone bridge according to an embodiment of this application.

As shown in FIG. 4, a structure of a pressure sensor 100 is shown. The pressure sensor 100 includes a Wheatstone bridge 101, the Wheatstone bridge 101 includes four bridge arms, each bridge arm includes a resistor R1, a resistor R2, a resistor R3, and a resistor Rx, the resistor Rx is a varistor, and the resistor R1, the resistor R2, and the resistor R3 are fixed resistors (resistors with fixed resistances). The resistor R2, the resistor R1, the resistor R3, and the resistor Rx are coupled (for example, in series) to form a loop, a coupling point of the resistor R1 and the resistor R2 is used as a first input terminal of the Wheatstone bridge 101, a coupling point of the resistor R3 and the resistor Rx is used as a second input terminal of the Wheatstone bridge 101, a coupling point of the resistor R2 and the resistor Rx is used as a first output terminal of the Wheatstone bridge 101, and a coupling point of the resistor R1 and the resistor R3 is used as a second output terminal of the Wheatstone bridge 101.

The first input terminal and the second input terminal of the Wheatstone bridge 101 are coupled to a voltage source U, and the voltage source U may be a constant voltage source (output constant voltage) or a pulse voltage source (output pulse voltage). The first output terminal and the second output terminal (collectively denoted by a symbol A) of the Wheatstone bridge 101 are used to output an electrical signal (for example, a current signal or a voltage signal), and may be coupled to a detector, and the detector may measure an electrical signal (for example, a current signal or a voltage signal) output by the pressure sensor 100.

Using that the pressure sensor 100 outputs a current signal as an example, assuming that a current Ia output by the pressure sensor 100 in a balanced state is zero, then I1*R1=I2*R2, I3*R3=Ix*Rx, I1=I3, and I2=Ix, where I1 is a current flowing through the resistor R1, I2 is a current flowing through the resistor R2, I3 is a current flowing through the resistor R3, and Ix is a current flowing through the resistor Rx, so as to obtain Rx/R2=R3/R1. That is, a resistance of the Rx in a normal temperature state may be set to be R2*R3/R1 according to the balanced state of the Wheatstone bridge 101.

Figure 5:
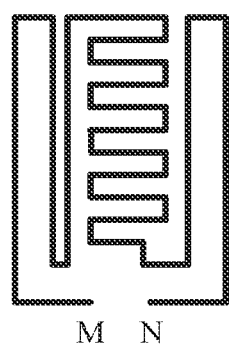
FIG. 5 is a schematic diagram of a structure of a wire wound resistor according to an embodiment of this application.
Figure 6:
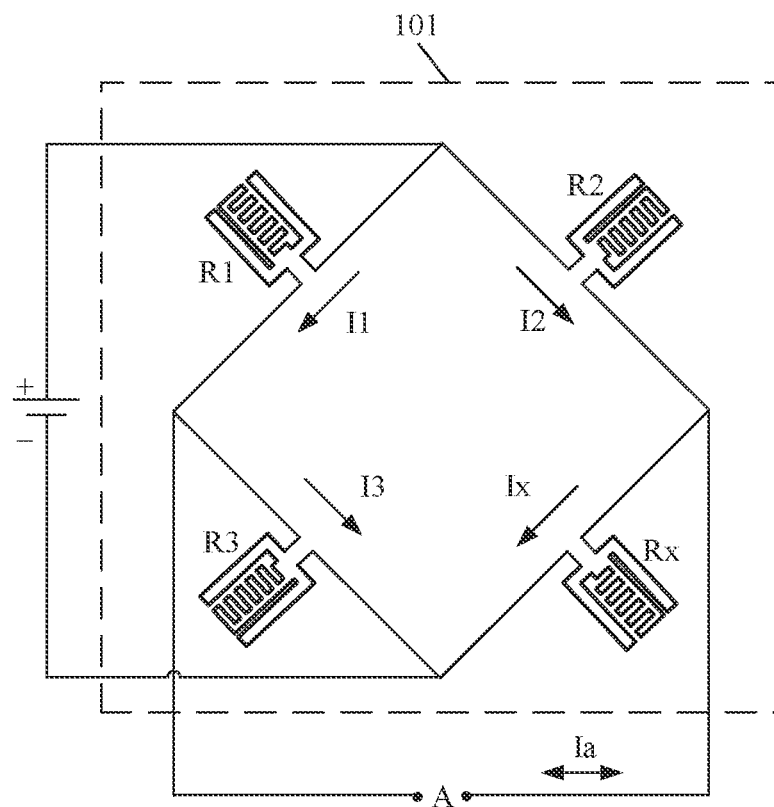
FIG. 6 is a schematic diagram of a structure of another pressure sensor including a Wheatstone bridge according to an embodiment of this application.

To implement miniaturization of the pressure sensor 100, each resistor of the Wheatstone bridge 101 may be designed as a wire wound resistor. For example, as shown in FIG. 5, a structure of a wire wound resistor is shown, M and N in the figure are two ends of the wire wound resistor, and a thick solid line is the wire wound resistor. Then, a structure of a pressure sensor including a Wheatstone bridge 101 is shown in FIG. 6.

Figure 7:
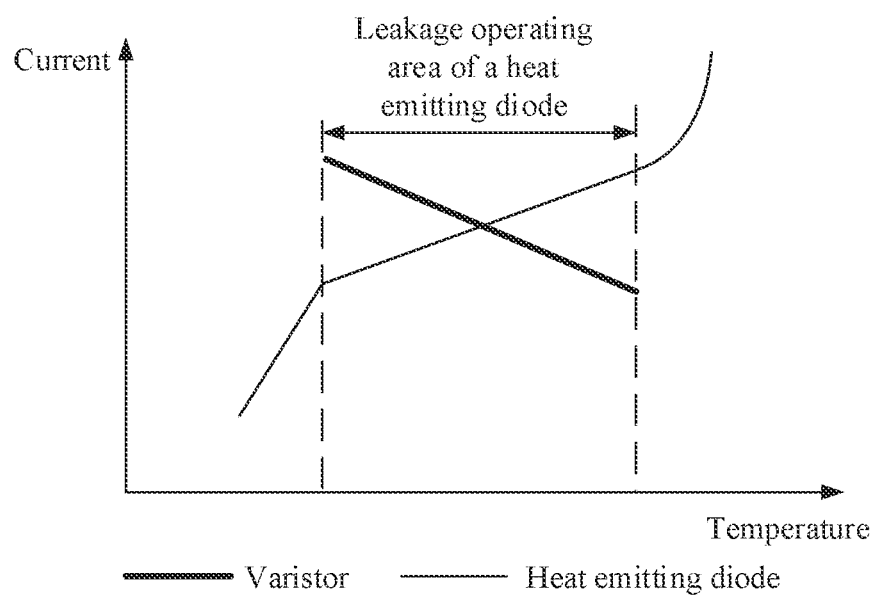
FIG. 7 is a schematic diagram of a temperature curve of a varistor and a heat emitting diode according to an embodiment of this application.

When ambient temperature changes or a user touches a pressure sensitive key, temperature of a varistor Rx changes, and a resistance of the varistor Rx also changes, thereby destroying the balanced state of the Wheatstone bridge 101. For example, as shown in FIG. 7, when temperature of the varistor Rx increases, a resistance of the varistor Rx will increase (a current flowing through decreases), and when the temperature of the resistor Rx decreases, the resistance of the resistor Rx will decrease (the current flowing through increases). In this way, even if the user has not actually pressed the pressure sensitive key, an electrical signal output by the pressure sensor 100 has changed. For example, when the pressure sensor 100 starts to output a current signal, the electronic device will misjudge that the pressure sensor 100 is pressed, so that detection accuracy of the pressure sensor 100 is reduced.

Therefore, an embodiment of this application provides a pressure sensor for coupling an output terminal of a Wheatstone bridge 101 to a heat emitting diode. In terms of a circuit connection relationship, a varistor Rx and the heat emitting diode are coupled (for example, in series). As shown in FIG. 7, when temperature increases, a breakover current of the heat emitting diode increases, which is equivalent to a decrease in a resistance; and when the temperature decreases, the breakover current of the heat emitting diode decreases, which is equivalent to an increase in the resistance. That is, a change trend of an equivalent resistance of the heat emitting diode with the temperature is opposite to that of the resistance of the varistor with the temperature, so as to compensate for a change in the resistance of the varistor due to temperature changes, and improve detection accuracy of the pressure sensor.

Figure 8:
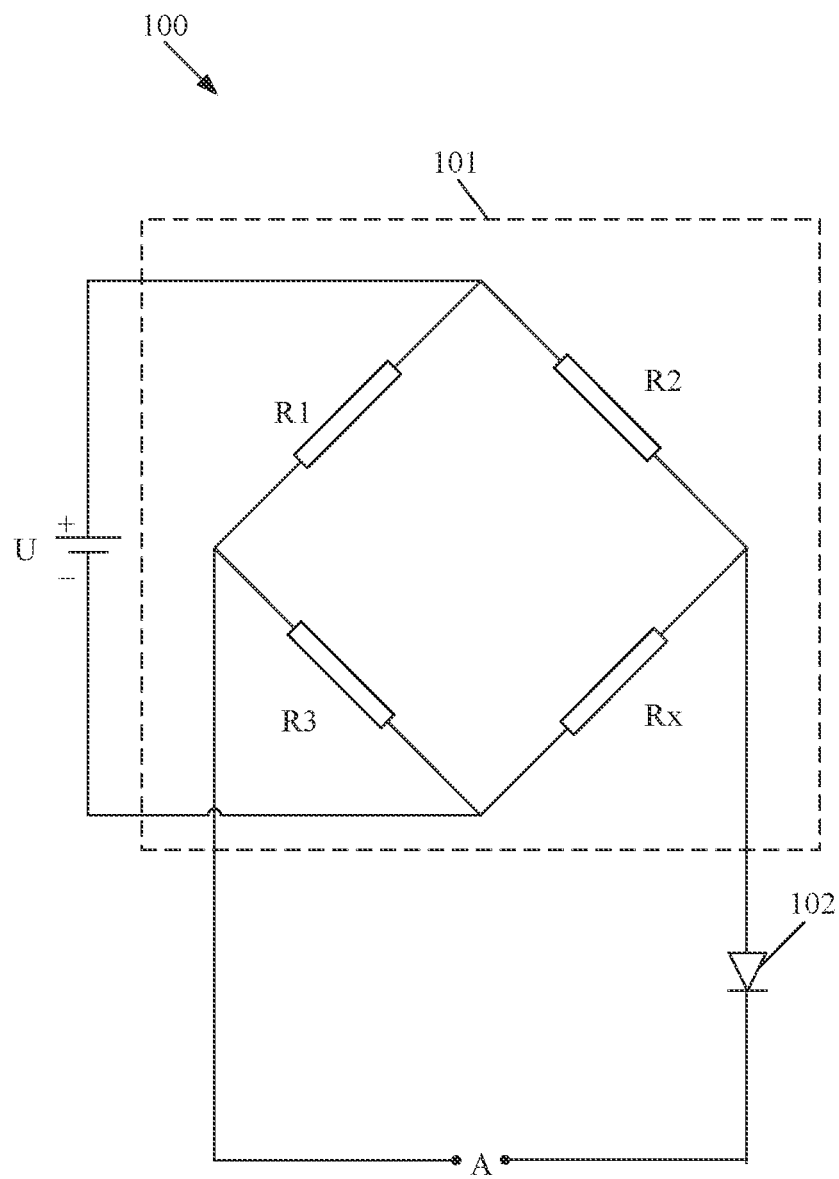
FIG. 8 is a schematic diagram of a structure of yet another pressure sensor including a Wheatstone bridge according to an embodiment of this application.

As shown in FIG. 8, an embodiment of this application provides another pressure sensor 100, including a Wheatstone bridge 101 and a heat emitting diode 102. An output terminal (for example, a first output terminal) of the Wheatstone bridge 101 is coupled to a first terminal of the heat emitting diode 102; and a second terminal of the heat emitting diode 102 and another output terminal (for example, a second output terminal) of the Wheatstone bridge 101 are used as two output terminals (collectively denoted by a symbol A) of the pressure sensor 100 for outputting an electrical signal (for example, a current signal or a voltage signal), and may be coupled to a processor 310 in FIG. 3.

Figure 9:
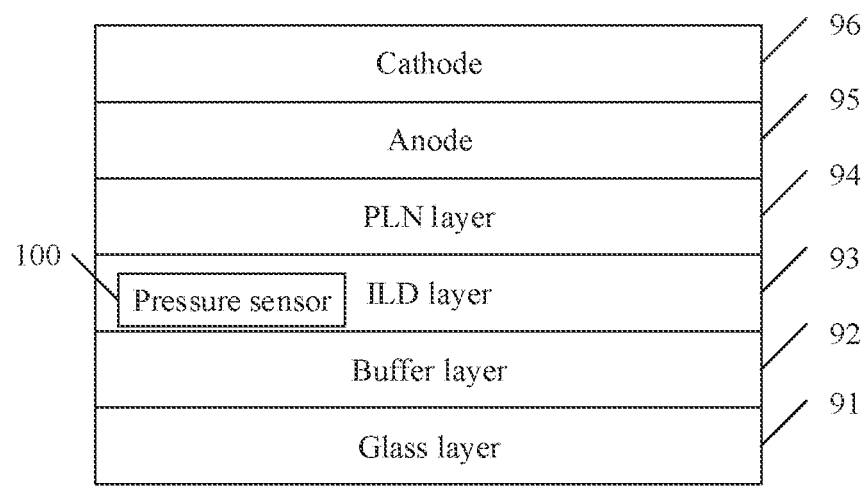
FIG. 9 is a schematic diagram of a structure of an OLED display according to an embodiment of this application.

The pressure sensor 100 may be integrated in an OLED display. As shown in FIG. 9, the OLED display includes a glass layer 91, a buffer layer 92, an interlevel dielectric (ILD) layer 93, a plain (PLN) layer 94, an anode 95, and a cathode 96. The pressure sensor 100 may be disposed in the ILD layer 93 or another layer of the OLED display. In this case, the pressure sensor 100 may output an electrical signal corresponding to a touch pressure of the OLED display to the processor 310, so that the processor 310 can process the electrical signal to obtain a pressure.

To integrate the pressure sensor 100 into the OLED display, resistors (a resistor R1, a resistor R2, a resistor R3, and a resistor Rx) in the Wheatstone bridge 101 may be designed as film resistors, for example, semiconductor film resistors or high impedance metal film resistors. The semiconductor film resistors may include amorphous silicon (a-Si) film resistors, low temperature poly-silicon (LTPS) film resistors, indium gallium zinc oxide (IGZO) film resistors, and the like. The high impedance metal film resistors may include high impedance metals such as nickel, copper, manganese, and chromium. The resistors of the Wheatstone bridge 101 may be made of the same material or different materials, and may have the same resistance or different resistances, provided that the Wheatstone bridge 101 is kept in a balanced state at normal temperature.

The heat emitting diode 102 includes a channel (a P-channel or an N-channel) and a metal layer. The channel and the metal layer form a heat emitting interface. When temperature increases, a breakover current and a breakover voltage between the channel and the metal layer decrease linearly, which is equivalent to an increase in the resistance of the heat emitting diode; and when the temperature decreases, the breakover current and the breakover voltage between the channel and the metal layer increase linearly, which is equivalent to a decrease in the resistance of the heat emitting diode.

According to the pressure sensor provided in this embodiment of this application, the varistor in the Wheatstone bridge is coupled to the heat emitting diode. When temperature increases, a breakover current of the heat emitting diode increases, which is equivalent to a decrease in a resistance; and when the temperature decreases, the breakover current of the heat emitting diode decreases, which is equivalent to an increase in the resistance. That is, a change trend of an equivalent resistance of the heat emitting diode with the temperature is opposite to that of the resistance of the varistor with the temperature, so as to compensate for a change in the resistance of the varistor due to temperature changes, and improve detection accuracy of the pressure sensor.

Figure 10:
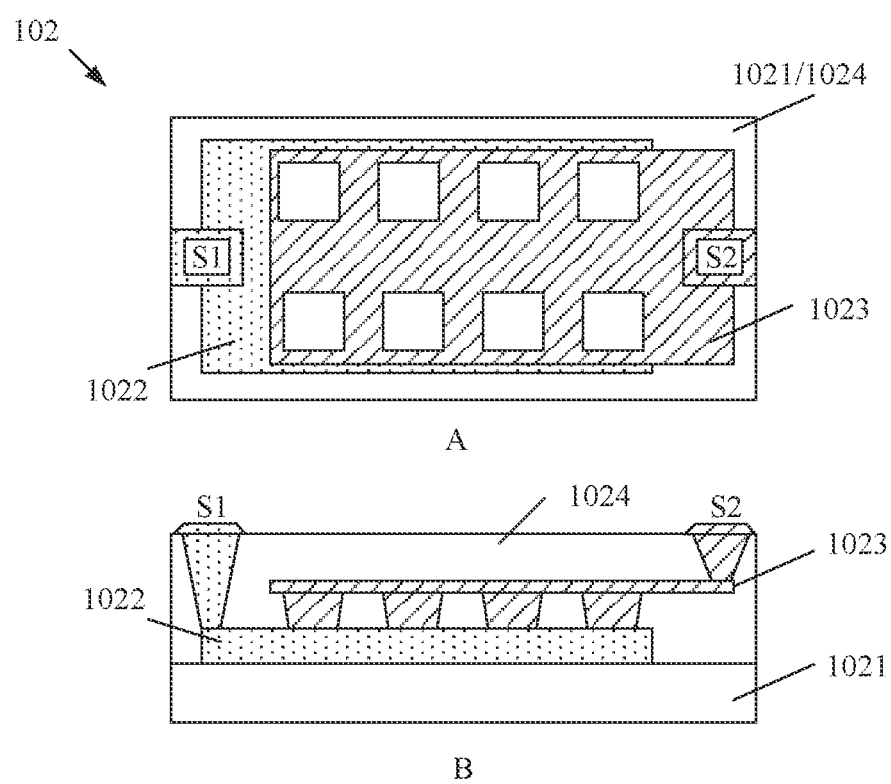
FIG. 10 is a schematic diagram of a structure of a heat emitting diode according to an embodiment of this application.

For example, in a possible implementation, as shown in FIG. 10, a top view (A in FIG. 10) and a sectional view (B in FIG. 10) of a P-type heat emitting diode 102 are shown. The heat emitting diode 102 may include a substrate 1021, an LTPS P-channel metal oxide semiconductor (PMOS) 1022 disposed on the substrate 1021, and a first metal layer 1023 disposed on the LTPS PMOS 1022, where the first metal layer 1023 may be a metal such as molybdenum (MO), aluminum (AL) and copper (Cu), or an alloy material of the foregoing metals, that is, may include at least one of molybdenum (MO), aluminum (AL), and copper (Cu). The heat emitting diode 102 may further include an insulating layer 1024, and the insulating layer 1024 is configured to fill remaining space of the heat emitting diode 102 to insulate the LTPS PMOS 1022 and the first metal layer 1023 from the outside.

A first contact (which may be referred to as an anode contact) Si is led out from the LTPS PMOS 1022 that serves as a high potential electrode (which, for example, may be referred to as an anode) of the heat emitting diode 102, and a second contact (which may be referred to as a cathode contact) S2 is led out from the first metal layer 1023 that serves as a low potential electrode (which, for example, may be referred to as a cathode) of the heat emitting diode 102. The first contact S1 may serve as the foregoing first terminal of the heat emitting diode 102, the second contact S2 may serve as the second terminal of the heat emitting diode 102, or the first contact Si may serve as the second terminal of the heat emitting diode 102, and the second contact may serve as the first terminal of the heat emitting diode 102.

There is a potential difference (an intrinsic potential) between the LTPS PMOS 1022 and the first metal layer 1023. Therefore, when a high voltage is input to the first contact S1 of the heat emitting diode 102 and a low voltage is input to the second contact S2 of the heat emitting diode 102, an external potential is in the same direction as an intrinsic potential, so that the heat emitting diode 102 is turned on. When a low voltage is input to the first contact Si of the heat emitting diode 102 and a high voltage is input to the second contact S2 of the heat emitting diode 102, an external potential is in an opposite direction to the intrinsic potential, so that the heat emitting diode 102 is in a leakage state.

The LTPS PMOS 1022 is in point contact with the first metal layer 1023 rather than in face contact to prevent the LTPS PMOS 1022 and the first metal layer 1023 from being directly turned on (that is, pressure drop is zero) due to a boundary effect caused by face contact, that is, the LTPS PMOS 1022 is in point contact with the first metal layer 1023 to form a heat emitting interface, so as to eliminate the boundary effect, and electrons are emitted from the first metal layer 1023 to the LTPS PMOS 1022. When temperature increases, electrons emitted from the first metal layer 1023 to the LTPS PMOS 1022 increase, and a breakover voltage between the LTPS PMOS 1022 and the first metal layer 1023 decreases linearly, which is equivalent to a decrease in the resistance of the heat emitting diode 102. When the temperature decreases, electrons emitted from the first metal layer 1023 to the LTPS PMOS 1022 decrease, and the breakover voltage between the LTPS PMOS 1022 and the first metal layer 1023 increases linearly, which is equivalent to an increase in the resistance of the heat emitting diode 102.

Figure 11:
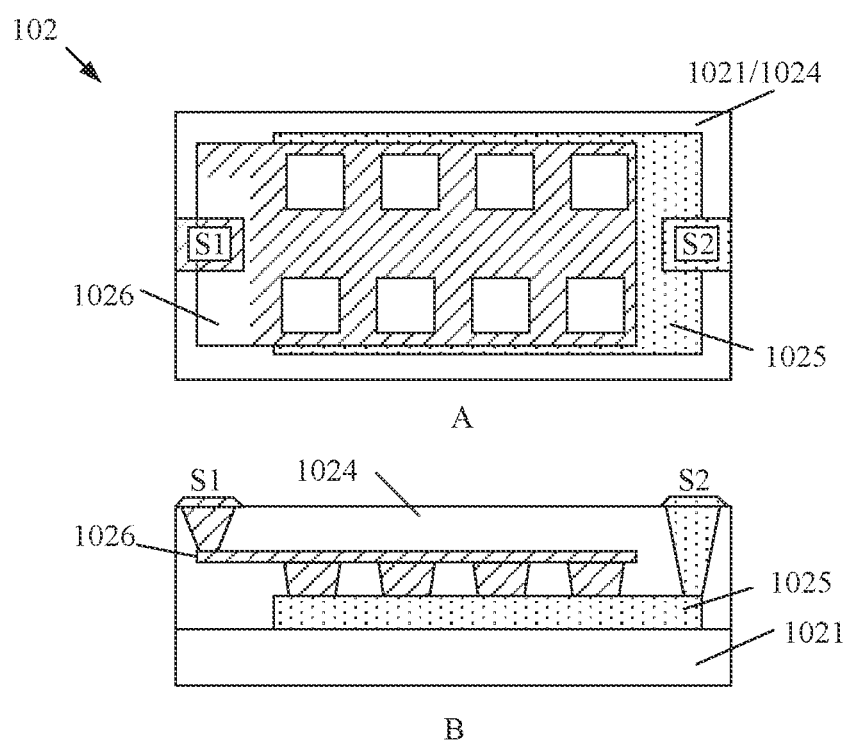
FIG. 11 is a schematic diagram of a structure of another heat emitting diode according to an embodiment of this application.

For example, in another possible implementation, as shown in FIG. 11, a top view (A in FIG. 11) and a sectional view (B in FIG. 11) of an N-type heat emitting diode 102 are shown. The heat emitting diode 102 may include a substrate 1021, an IGZO 1025 disposed on the substrate 1021, and a second metal layer 1026 disposed on the IGZO 1025, where the second metal layer 1026 may be a metal such as molybdenum (MO), aluminum (AL) and copper (Cu), or an alloy material of the foregoing metals, that is, may include at least one of molybdenum (MO), aluminum (AL), and copper (Cu). The heat emitting diode 102 may further include an insulating layer 1024, and the insulating layer 1024 is configured to fill remaining space of the heat emitting diode 102 to insulate the IGZO 1025 and the second metal layer 1026 from the outside.

A first contact (which may be referred to as an anode contact) Si is led out from the second metal layer 1026 that serves as a high potential electrode (which, for example, may be referred to as an anode) of the heat emitting diode 102, and a second contact (which may be referred to as a cathode contact) S2 is led out from the IGZO 1025 that serves as a low potential electrode (which, for example, may be referred to as a cathode) of the heat emitting diode 102. The first contact S1 may serve as the foregoing first terminal of the heat emitting diode 102, the second contact S2 may serve as the second terminal of the heat emitting diode 102, or the first contact S1 may serve as the second terminal of the heat emitting diode 102, and the second contact may serve as the first terminal of the heat emitting diode 102.

There is a potential difference (an intrinsic potential) between the IGZO 1025 and the second metal layer 1026. Therefore, when a high voltage is input to the first contact S1 of the heat emitting diode 102 and a low voltage is input to the second contact S2 of the heat emitting diode 102, an external potential is in the same direction as an intrinsic potential, so that the heat emitting diode 102 is turned on. When a low voltage is input to the first contact S1 of the heat emitting diode 102 and a high voltage is input to the second contact S2 of the heat emitting diode 102, an external potential is in an opposite direction to the intrinsic potential, so that the heat emitting diode 102 is in a leakage state.

The IGZO 1025 is in point contact with the second metal layer 1026 rather than in face contact to prevent the IGZO 1025 and the second metal layer 1026 from being directly turned on (that is, pressure drop is zero) due to a boundary effect caused by face contact, that is, the IGZO 1025 is in point contact with the second metal layer 1026 to form a heat emitting interface, so as to eliminate the boundary effect, and electrons are emitted from the IGZO 1025 to the second metal layer 1026. When temperature increases, electrons emitted from the IGZO 1025 to the second metal layer 1026 increase, and a breakover voltage between the IGZO 1025 and the second metal layer 1026 decreases linearly, which is equivalent to a decrease in the resistance of the heat emitting diode 102. When the temperature decreases, electrons emitted from the IGZO 1025 to the second metal layer 1026 decrease, and the breakover voltage between the IGZO 1025 and the second metal layer 1026 increases linearly, which is equivalent to an increase in the resistance of the heat emitting diode 102.

Figure 12:
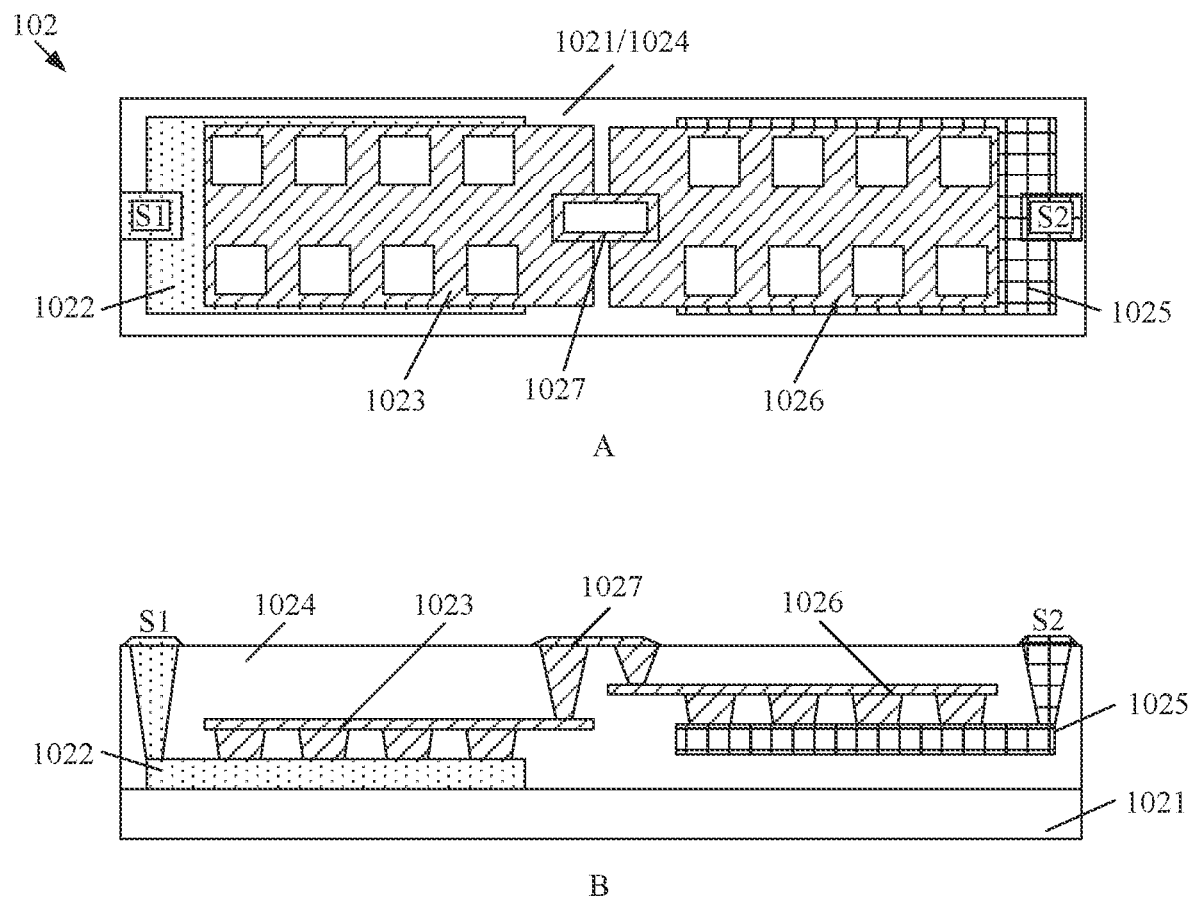
FIG. 12 is a schematic diagram of a structure of yet another heat emitting diode according to an embodiment of this application.

For example, in yet another possible implementation, as shown in FIG. 12, a top view (A in FIG. 12) and a sectional view (B in FIG. 12) of a compound (P-type and N-type) heat emitting diode 102 are shown. The heat emitting diode 102 may include a substrate 1021, an LTPS PMOS 1022 disposed on the substrate 1021, a first metal layer 1023 disposed on the LTPS PMOS 1022, an IGZO 1025, and a second metal layer 1026 disposed on the IGZO 1025, where the first metal layer 1023 and the second metal layer 1026 are coupled (for example, in series) by using a bridge wire 1027. The first metal layer 1023 or the second metal layer 1026 may be a metal such as molybdenum (MO), aluminum (AL) and copper (Cu), or an alloy material of the foregoing metals, that is, may include at least one of molybdenum (MO), aluminum (AL), and copper (Cu). The heat emitting diode 102 may further include an insulating layer 1024, and the insulating layer 1024 is configured to fill remaining space of the heat emitting diode 102 to insulate the LTPS PMOS 1022, the first metal layer 1023, the IGZO 1025, and the second metal layer 1026 from the outside.

A first contact (which may be referred to as an anode contact) S1 is led out from the LTPS PMOS 1022 that serves as a high potential electrode (which, for example, may be referred to as an anode) of the heat emitting diode 102, and a second contact (which may be referred to as a cathode contact) S2 is led out from the IGZO 1025 that serves as a low potential electrode (which, for example, may be referred to as a cathode) of the heat emitting diode 102. The first contact S1 may serve as the foregoing first terminal of the heat emitting diode 102, the second contact S2 may serve as the second terminal of the heat emitting diode 102, or the first contact Si may serve as the second terminal of the heat emitting diode 102, and the second contact may serve as the first terminal of the heat emitting diode 102.

The heat emitting diode 102 is equivalent to the P-type heat emitting diode in FIG. 10 and the N-type heat emitting diode in FIG. 11 that are coupled (for example, in series) by using the bridge wire 1027. Therefore, for an operating principle and a technical effect thereof, reference is made to related descriptions in FIG. 10 and FIG. 11. Details are not described herein again.

Figure 13:
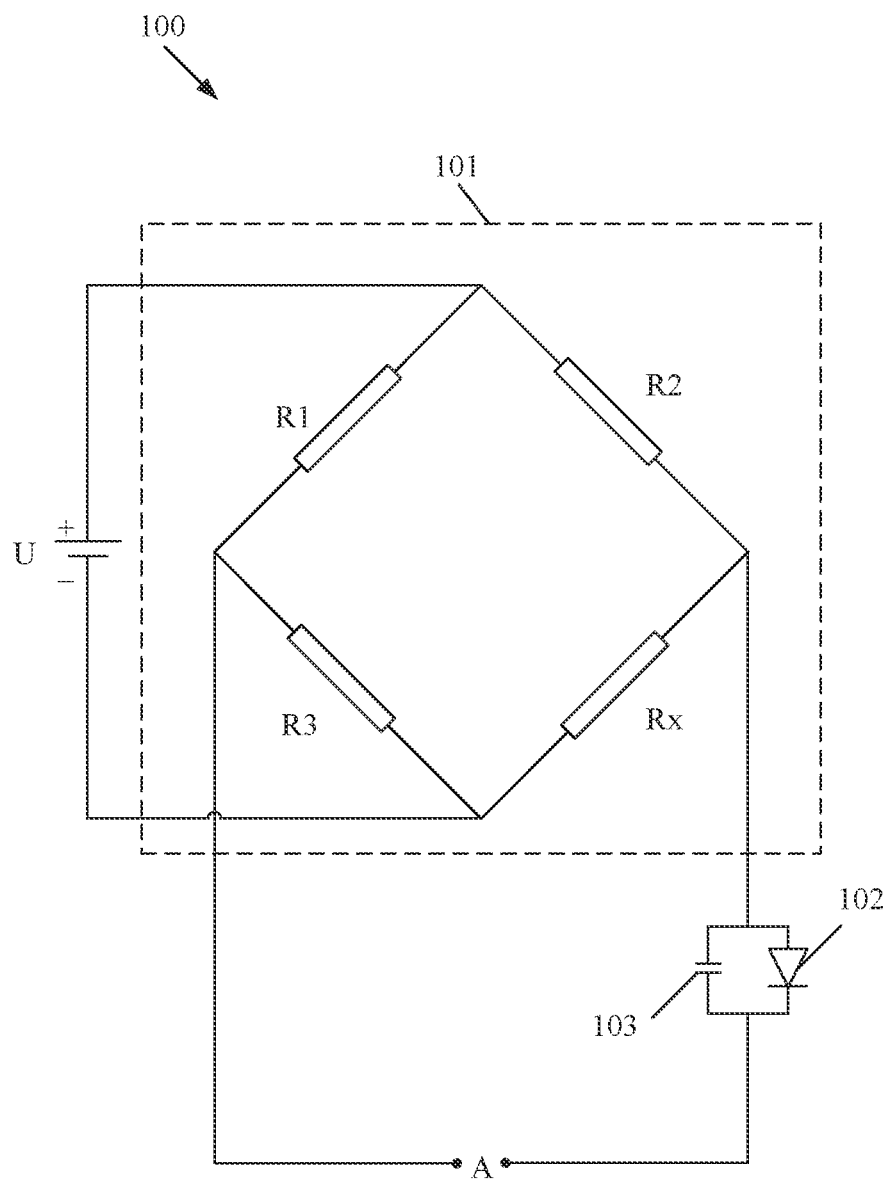
FIG. 13 is a schematic diagram of a structure of yet another pressure sensor including a Wheatstone bridge according to an embodiment of this application.

In addition, as shown in FIG. 13, the first output terminal of the Wheatstone bridge 101 shown in FIG. 8 may be further coupled to a high frequency capacitor 103, and the first input terminal and the second input terminal of the Wheatstone bridge 101 may be further coupled to an alternating current signal generator, where the alternating current signal generator is configured to output an alternating current signal (for example, a sinusoidal wave, a triangular wave, or a pulse) to the pressure sensor. If a direct current signal is input to an input terminal of the pressure sensor 100 for a long time, power consumption will be increased on the one hand, and on the other hand, aging of the device is caused, and detection accuracy of the pressure sensor 100 is easily reduced. Therefore, high frequency detection may be implemented by inputting an alternating current signal to the input terminal of the pressure sensor 100, so that the foregoing problems can be avoided.

Figure 14:
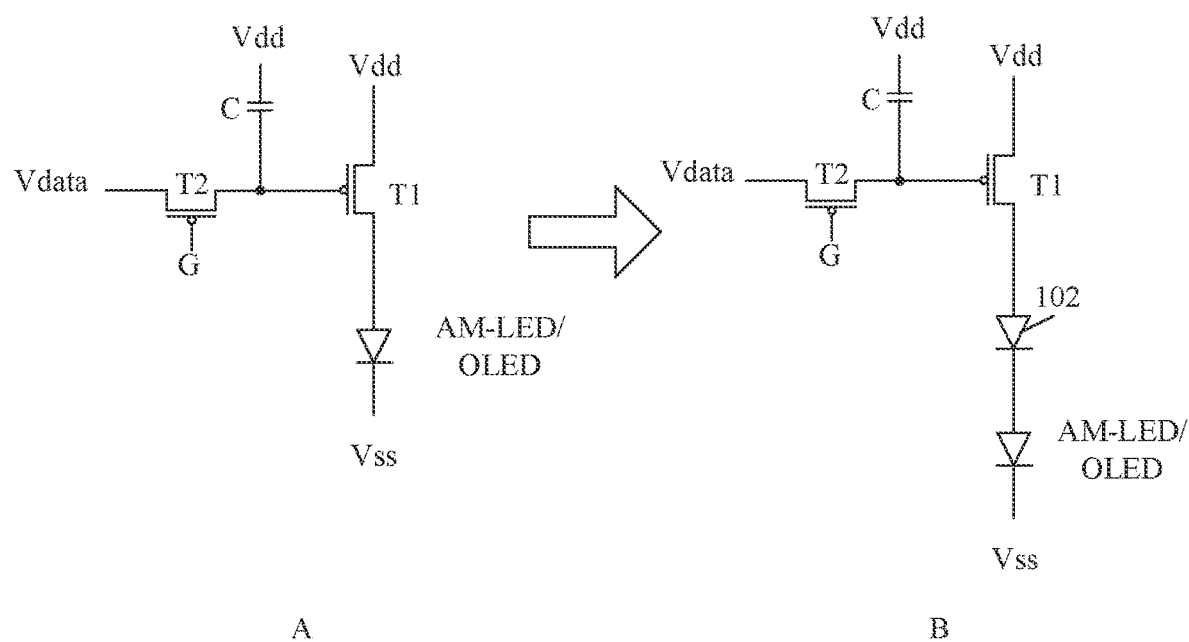
FIG. 14 is a schematic diagram of a driving circuit of an AM-LED or OLED according to an embodiment of this application.

In addition, as shown in A in FIG. 14, a driving circuit of an AM-LED or OLED is shown. A source of an MOS transistor T2 is coupled to one terminal of a capacitor C and a gate of a transistor T1, a signal voltage Vdata is input to a drain of the MOS transistor T2, a power supply voltage Vdd is input to another terminal of the capacitor C and a drain of the MOS transistor T1, a source of the MOS transistor T1 is coupled to an anode of the AM-LED or OLED, and a voltage Vss is input to the anode of the AM-LED or OLED. During operation, a voltage is applied to a gate of the MOS transistor T2 to turn on the MOS transistor T2, and the signal voltage Vdata is applied to the gate of the MOS transistor T1 by using the transistor T2, so that the MOS transistor T1 is turned on, and the power supply voltage Vdd is applied to the anode of the AM-LED or OLED by using the MOS transistor T1, so as to cause the AM-LED or OLED to emit light. However, because the AM-LED or OLED emits heat during light emitting, an equivalent resistance of the AM-LED or OLED increases, so that a driving current of the AM-LED or OLED is reduced, and a light-emitting intensity of the AM-LED or OLED is reduced.

Therefore, as shown in B in FIG. 14, the AM-LED or OLED may be coupled to the foregoing heat emitting diode 102. In this case, the AM-LED or OLED is equivalent to the foregoing varistor. When temperature increases, a breakover current of the heat emitting diode increases, which is equivalent to a decrease in a resistance; and when the temperature decreases, the breakover current of the heat emitting diode decreases, which is equivalent to an increase in the resistance. That is, a change trend of an equivalent resistance of the heat emitting diode with the temperature is opposite to that of the resistance of the AM-LED or OLED with the temperature, so as to compensate for an increase in the equivalent resistance of the AM-LED or OLED due to the emitted heat, which does not reduce a light-emitting intensity of the AM-LED or OLED.

The foregoing descriptions are merely specific implementations of this application, but are not intended to limit the protection scope of this application. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A pressure sensor, comprising:
a Wheatstone bridge; and
a heat emitting diode,
wherein the Wheatstone bridge comprises a first resistor, a second resistor, a third resistor, and a fourth resistor;
wherein the first resistor, the second resistor, the third resistor, and the fourth resistor are coupled to form a loop, a coupling point of the first resistor and the second resistor serves as a first input terminal of the Wheatstone bridge, a coupling point of the third resistor and the fourth resistor serves as a second input terminal of the Wheatstone bridge, a coupling point of the second resistor and the fourth resistor serves as a first output terminal of the Wheatstone bridge and is coupled to a first terminal of the heat emitting diode, and a coupling point of the first resistor and the third resistor serves as a second output terminal of the Wheatstone bridge;
wherein the first resistor, the second resistor, and the third resistor are fixed resistors, and the fourth resistor is a varistor;

wherein based on an increase in temperature, an equivalent resistance of the heat emitting diode decreases, and a resistance of the fourth resistor increases;

wherein based on a decrease in temperature, the equivalent resistance of the heat emitting diode increases, and the resistance of the fourth resistor decreases; and wherein the first input terminal and the second input terminal of the Wheatstone bridge are configured to input a constant voltage or a pulse voltage, and the second output terminal of the Wheatstone bridge and the second terminal of the heat emitting diode are configured to output an electrical signal.

2. The pressure sensor according to claim 1, wherein the heat emitting diode comprises:
a low temperature polysilicon (LTPS) P-channel metal oxide semiconductor (PMOS); and
a first metal layer disposed on the LTPS PMOS,
wherein the LTPS PMOS is in point contact with the first metal layer, a first contact is led out from the LTPS PMOS, and a second contact is led out from the first metal layer.

3. The pressure sensor according to claim 2,
wherein the first contact is the first terminal of the heat emitting diode, and the second contact is the second terminal of the heat emitting diode; or
wherein the first contact is the second terminal of the heat emitting diode, and the second contact is the first terminal of the heat emitting diode.

4. The pressure sensor according to claim 2, wherein the metal layer comprises at least one of molybdenum, aluminum, or copper.

5. The pressure sensor according to claim 1, wherein the heat emitting diode comprises:
an indium gallium zinc oxide (IGZO); and
a second metal layer disposed on the IGZO,
wherein the IGZO is in point contact with the second metal layer, a first contact is led out from the second metal layer, and a second contact is led out from the IGZO.

6. The pressure sensor according to claim 1, wherein the heat emitting diode comprises:
a low temperature polysilicon (LTPS) P-channel metal oxide semiconductor (PMOS);
an indium gallium zinc oxide (IGZO);
a first metal layer disposed on the LTPS PMOS; and
a second metal layer disposed on the IGZO,
wherein the first metal layer and the second metal layer are coupled, the LTPS PMOS is in point contact with the first metal layer, the IGZO is in point contact with the second metal layer, a first contact is led out from the LTPS PMOS, and a second contact is led out from the IGZO.

7. The pressure sensor according to claim 1, wherein the first output terminal of the Wheatstone bridge is further coupled to a capacitor.

8. The pressure sensor according to claim 1, wherein the first input terminal and the second input terminal of the Wheatstone bridge are further coupled to an alternating current signal generator.

9. The pressure sensor according to claim 1, wherein the first resistor, the second resistor, or the third resistor is a film resistor, and the film resistor comprises a semiconductor film resistor and a high impedance metal film resistor.

10. The pressure sensor according to claim 9, wherein the semiconductor film resistor comprises an amorphous silicon film resistor, a low temperature polysilicon (LTPS) film resistor, and an IGZO indium gallium zinc oxide (IGZO) film resistor.

11. The pressure sensor according to claim 9, wherein the high impedance metal film resistor comprises nickel, copper, manganese, and chromium.

12. The pressure sensor according to claim 1, wherein the pressure sensor is disposed in an interlevel dielectric layer of an organic light-emitting diode (OLED) display.

13. An electronic device, comprising:
an organic light-emitting diode (OLED) display; and
a processor,
wherein the OLED display comprises a pressure sensor configured to output an electrical signal corresponding to a touch pressure of the OLED display to the processor; and
wherein the pressure sensor comprises:
a Wheatstone bridge; and
a heat emitting diode,
wherein the Wheatstone bridge comprises a first resistor, a second resistor, a third resistor, and a fourth resistor;
wherein the first resistor, the second resistor, the third resistor, and the fourth resistor are coupled to form a loop, a coupling point of the first resistor and the second resistor serves as a first input terminal of the Wheatstone bridge, a coupling point of the third resistor and the fourth resistor serves as a second input terminal of the Wheatstone bridge, a coupling point of the second resistor and the fourth resistor serves as a first output terminal of the Wheatstone bridge and is coupled to a first terminal of the heat emitting diode, and a coupling point of the first resistor and the third resistor serves as a second output terminal of the Wheatstone bridge;
wherein the first resistor, the second resistor, and the third resistor are fixed resistors, and the fourth resistor is a varistor;
wherein based on an increase in temperature, an equivalent resistance of the heat emitting diode decreases, and a resistance of the fourth resistor increases;
wherein based on a decrease in temperature, the equivalent resistance of the heat emitting diode increases, and the resistance of the fourth resistor decreases; and
wherein the first input terminal and the second input terminal of the Wheatstone bridge are configured to input a constant voltage or a pulse voltage, and the second output terminal of the Wheatstone bridge and the second terminal of the heat emitting diode are configured to output an electrical signal.

14. The electronic device according to claim 13, wherein the heat emitting diode comprises:
a low temperature polysilicon (LTPS) P-channel metal oxide semiconductor (PMOS); and
a first metal layer disposed on the LTPS PMOS,
wherein the LTPS PMOS is in point contact with the first metal layer, a first contact is led out from the LTPS PMOS, and a second contact is led out from the first metal layer.

15. The electronic device according to claim 14,
wherein the first contact is the first terminal of the heat emitting diode, and the second contact is the second terminal of the heat emitting diode; or wherein the first contact is the second terminal of the heat emitting diode, and the second contact is the first terminal of the heat emitting diode.

16. The electronic device according to claim 14, wherein the metal layer comprises at least one of molybdenum, aluminum, or copper.

17. The electronic device according to claim 13, wherein the heat emitting diode comprises:
- an indium gallium zinc oxide (IGZO); and
- a second metal layer disposed on the IGZO,
- wherein the IGZO is in point contact with the second metal layer, a first contact is led out from the second metal layer, and a second contact is led out from the IGZO.

18. The electronic device according to claim 13, wherein the heat emitting diode comprises:
- a low temperature polysilicon (LTPS) P-channel metal oxide semiconductor (PMOS);
- an indium gallium zinc oxide (IGZO);
- a first metal layer disposed on the LTPS PMOS; and
- a second metal layer disposed on the IGZO,
- wherein the first metal layer and the second metal layer are coupled, the LTPS PMOS is in point contact with the first metal layer, the IGZO is in point contact with the second metal layer, a first contact is led out from the LTPS PMOS, and a second contact is led out from the IGZO.

19. The electronic device according to claim 13, wherein the first output terminal of the Wheatstone bridge is further coupled to a capacitor.

20. The electronic device according to claim 13, wherein the first input terminal and the second input terminal of the Wheatstone bridge are further coupled to an alternating current signal generator.

\* \* \* \* \*

UNITED STATES PATENT AND TRADEMARK OFFICE
CERTIFICATE OF CORRECTION

| | | |
|---|---|---|
| PATENT NO. | : 12,359,995 B2 | Page 1 of 1 |
| APPLICATION NO. | : 18/022382 | |
| DATED | : July 15, 2025 | |
| INVENTOR(S) | : An et al. | |

It is certified that error appears in the above-identified patent and that said Letters Patent is hereby corrected as shown below:

In the Claims

Claim 10, Column 16, Line 2: "resistor, and an IGZO indium gallium zinc oxide (IGZO)" should read -- resistor, and an indium gallium zinc oxide (IGZO) --.

Signed and Sealed this
Twelfth Day of August, 2025

Coke Morgan Stewart
*Acting Director of the United States Patent and Trademark Office*